(12) United States Patent
Wolf et al.

(10) Patent No.: US 9,550,299 B2
(45) Date of Patent: Jan. 24, 2017

(54) ROBOTIC MECHANISM WITH TWO DEGREES OF FREEDOM

(71) Applicant: TECHNION RESEARCH & DEVELOPMENT FOUNDATION LTD., Haifa (IL)

(72) Inventors: Alon Wolf, Haifa (IL); Oded Salomon, Kiriat Tivon (IL)

(73) Assignee: Technion Research & Development Foundation Ltd., Technion, Haifa (IL)

( * ) Notice: Subject to any disclaimer, the term of this patent is extended or adjusted under 35 U.S.C. 154(b) by 209 days.

(21) Appl. No.: 14/361,326

(22) PCT Filed: Nov. 29, 2012

(86) PCT No.: PCT/IL2012/000383
§ 371 (c)(1),
(2) Date: May 29, 2014

(87) PCT Pub. No.: WO2013/080197
PCT Pub. Date: Jun. 6, 2013

(65) Prior Publication Data
US 2015/0047452 A1    Feb. 19, 2015

Related U.S. Application Data

(60) Provisional application No. 61/564,454, filed on Nov. 29, 2011.

(51) Int. Cl.
*B25J 17/00* (2006.01)
*B25J 17/02* (2006.01)
*B25J 18/00* (2006.01)

(52) U.S. Cl.
CPC .............. *B25J 17/00* (2013.01); *B25J 17/0275* (2013.01); *Y10S 901/28* (2013.01); *Y10T 74/20329* (2015.01)

(58) Field of Classification Search
CPC ....... B25J 17/0275; B25J 17/0283; B25J 9/06; B25J 17/025; B25J 17/0266; B25J 9/065; B25J 17/0258; B25J 9/109; B25J 19/0025; B25J 19/0029
See application file for complete search history.

(56) References Cited

U.S. PATENT DOCUMENTS

| | | |
|---|---|---|
| 4,683,406 A | 7/1987 | Ikeda et al. |
| 4,990,050 A * | 2/1991 | Tsuge ...................... B23Q 1/54 414/735 |

(Continued)

OTHER PUBLICATIONS

The JPL Serpentine Robot: a 12 DOF system for inspection Eric Paljug, Timothy Ohm and Samad Hayati, Dec. 31, 1995, whole doccument.*

(Continued)

*Primary Examiner* — William Kelleher
*Assistant Examiner* — Jake Cook
(74) *Attorney, Agent, or Firm* — Daniel J. Swirsky; AlphaPatent Associates Ltd.

(57) ABSTRACT

A robotic link mechanism comprising a pair of base elements connected by a passive flexible joint, such that flexure of the joint changes the mutual orientation of the base elements. A pair of obliquely truncated cylinders are confined between the base elements such that the obliquely formed end surfaces of the cylinders can rotate in sliding contact with each other, and the other end of each cylinder can rotate in sliding contact with its associated base element. Driving motors are attached to the base elements, each one controlled to rotate the cylinder associated with that base element, such that rotation of at least one of the cylinders causes the base elements to undergo change in their mutual orientation. The mechanism thus has a backbone composed of the passive flexible joint, which is supported and actuated (Continued)

by the oblique truncated cylindrical structure that serves as an active exoskeleton.

19 Claims, 9 Drawing Sheets

(56) References Cited

U.S. PATENT DOCUMENTS 4,997,413 A * 3/1991 Dahlquist .............. B25J 17/025
 475/163
6,871,563 B2 * 3/2005 Choset ..................... B25J 9/102
 74/490.01

OTHER PUBLICATIONS

Design Space and Motion Development for a Pole Climbing Serpentine Robot Featuring Actuated Universal joints, Gabriel Jacob Goldman, Mar. 3, 2009, pp. 89-90.*
PCT International Search Report and Written Opinion of the ISA, mailed Feb. 20, 2013 in PCT/IL2012/000383.
S. Hirose et al, "Float Arm V: hyper redundant manipulator with wire-driven weight-compensation mechanism," Proceedings ICRA, pp. 368-373, 2003.
A. Wolf et al, "Design and control of a mobile hyper-redundant urban search and rescue robot", International Journal of Advanced Robotics, vol. 19, pp. 221-248, 2005.
Ma et al, "Development of a hyper-redundant multijoint manipulator for maintenance of nuclear reactors," International Journal of Advanced Robotics, vol. 9, pp. 28 1-300, 1995.
G.S. Chirikjian and J. W. Burdick, "A modal approach to hyper-redundant manipulator kinematics," IEEE Transactions on Robotics and Automation, vol. 10, pp. 343-354, 1994.
R. Cieslak et al, "Elephant trunk type elastic manipulator—A tool for bulk and liquid materials transportation," Robotica, vol. 17, pp. 11-16, 1999.
V.A. Sujan and S. Dubowsky, "Design of a Lightweight hyper-redundant deployable binary manipulator," ASME Journal of Mechanical Design, vol. 126, pp. 29-39, 2004.
G. Legnani et al."A new isotropic and decoupled 6-DoF parallel manipulator" Mechanism and Machine Theory, 58, pp. 64-82 (2012).

* cited by examiner

ROBOTIC MECHANISM WITH TWO DEGREES OF FREEDOM

CROSS-REFERENCE TO RELATED APPLICATIONS

This application is a U.S. National Phase Application under 35 U.S.C. 371 of International Application No. PCT/IL2012/000383, which has an international filing date of Nov. 29, 2012, and which claims the benefit of priority of U.S. Provisional Patent Application No. 61/564,454, filed Nov. 29, 2011, the disclosures of which are incorporated herein by reference in their entirety.

FIELD OF THE INVENTION

The present invention relates to the field of robotic actuated mechanisms, especially those having a high load lifting capability and light weight, such that they are capable of being stacked end-to-end to provide a hyper-redundant, high flexibility, long robotic arm.

BACKGROUND OF THE INVENTION

A redundant robot has at least one more degree of freedom (DOF) than required for it to perform its intended function, in order to compensate for simple constraints, i.e., using an elbow up configuration as compared to an elbow down configuration to reach a target position. Hyper-redundant robots (HRR) have many more DOFs than required, which enables them to handle more constraints, such as those present in highly convoluted volumes, and at the same time enables them to perform a variety of tasks. HRRs are very versatile, as can be seen by looking at their biological counterparts, such as snakes, elephant trunks, and worms, all of which can poke into and crawl through crevices and convoluted passages, as well as manipulate objects. Starting in 1972 with Hirose's pioneering work in HRR design, as described in S. Hirose, *Biologically Inspired Robots: Snake-like Locomotors and Manipulators*: Oxford University Press, 1993 and followed by the work of G. S. Chirikjian and J. W. Burdick, as described in the article "A modal approach to hyper-redundant manipulator kinematics, *IEEE Transactions on Robotics and Automation*", vol. 10, pp. 343-354, 1994, there has been considerable attention paid to HRR design. The maneuverability inherent in these types of mechanical structures and their compliance, i.e., their ability to conform to environmental constraints, allow them to overcome obstacles of significant complexity compared to conventional robots; hence they have become a challenge for robotic mechanism designers. Recently, other researchers, such as Yim, as described at http://robotics.stanford.edu/users/mark/bio.html; Miller in "Snake robots for research and rescue", published by The MIT Press, Cambridge, Mass.: 2002, and Haith et al of at NASA Ames, as described in "Serpentine Robot for Planetary and Asteroid Surface Exploration", presented as an oral presentation at the Fourth IAA International Conference on Low-Cost Planetary Missions, Laurel, Md., 2000, have extended Hirose's pioneering work on snake locomotion, where Yim and Haith used Yim's Polybot modules to design a modular hyper-redundant robot. In U.S. Pat. No. 4,683,406 to Ikeda and Takanashi for "Joint Assembly Movable Like a Human Arm", a new two-DOF joint for snake robots that allowed a more compact design is described. This joint used a passive universal joint to prevent adjacent bays from twisting while at the same time allowing two degrees of freedom: bending and orienting. This universal joint enveloped an angular swivel joint, which provided the two degrees of freedom. The universal joint, which was installed on the outside, rendered the joint relatively bulky. The design in U.S. Pat. No. 4,683,406 was "inverted" by placing a small universal joint in the interior of the robot, as described at http://technology.jpl.nasa.gov/gallery/tech/Gallery/gallery/gl_pages/P44487.html;

This allowed for a more compact design, but came at the cost of strength and stiffness (backlash). Other known designs use cable/tendon actuation systems for driving the robot, yet these designs are somewhat cumbersome and require quite a large external driving system, as shown in the article by R. Cieslak et al, "Elephant trunk type elastic manipulator—A tool for bulk and liquid materials transportation" published in Robotica, vol. 17, pp. 11-16, 1999. Ma et. al in the article S. Ma, H. Hirose, and H. Yoshinada, "Development of a hyper-redundant multijoint manipulator for maintenance of nuclear reactors", International Journal of Advanced Robotics, vol. 9, pp. 28 1-300, 1995, have also presented the mechanical design of a HRR and its control algorithm for the inspection of confined spaces. An actuated universal joint design was presented in the article by A. Wolf, et al, "Design and control of a mobile hyper-redundant urban search and rescue robot," International Journal of Advanced Robotics, vol. 19, pp. 221-248, 2005. For this design, U-joint "crosses" are connected to one link with a pitch pivot joint, and to the next with a yaw pivot joint. The pitch and yaw joints are always orthogonal, and intersect along the link axes, leading to a relatively simple kinematic system. The pitch and yaw joints are actuated by linear actuators placed within the link's envelope. The links are configured such that the axes at each end of any link are parallel; thus, one link has pitch joints at both ends actuated by its two linear actuators; the next link has two yaw joints. This arrangement facilitates packaging of the two linear actuators side-by-side within the link. In V. A. Sujan, and S. Dubowsky, "Design of a lightweight hyper-redundant deployable binary manipulator", published in ASME Journal of Mechanical Design, vol. 126, pp 29-39, 2004, there is shown a design for a new lightweight, hyper-redundant, deployable Binary Robotic Articulated Intelligent Device (BRAID), for space robotic systems. The device is based on embedded muscle type binary actuators and flexure linkages. Such a system may be used for a wide range of tasks, and requires minimal control computation and power resources. In the article by S. Hirose, et al, "Float arm V: hyper redundant manipulator with wire-driven weight-compensation mechanism,", published in Proceedings ICRA, pp. 368-373, 2003, the authors used wires to design a wire-driven weight-compensation mechanism. The mechanism consisted of a parallelogram linkage mechanism that had an extended portion with the wired double pulley.

One of the biggest challenges in the design of a hyper-redundant long manipulator is maintaining reasonable dimensions and low self-weight, while not compromising the rigidity of the structure and its accuracy. Usually, these design criteria are counter-intuitive, since rigidity is usually achieved by use of structures having large physical dimensions and high self-weight, the latter being a particular disadvantage in long robotic manipulator arms.

Many of the prior art robotic arm implementations have these limitations, and involve complex or massive structures to provide the rigidity required by long robotic arms. There therefore exists a need for a robotic actuator link which achieves high rigidity and accuracy while still maintaining a comparatively low weight, and thus overcomes at least some of the disadvantages of prior art robotic actuator links.

The disclosures of each of the publications mentioned in this section and in other sections of the specification, are hereby incorporated by reference, each in its entirety.

SUMMARY

The present disclosure describes a new exemplary robotic actuator link mechanism having two active degrees of freedom, which provides high rigidity, and yet is of light weight. The link mechanism comprises a pair of base elements, which may conveniently be in the form of flanges, and which can be considered to represent what is termed commonly as the base of the robotic device and the activated platform or arm of the robotic link mechanism. These base elements are connected together by a centralized passive flexible joint, which may conveniently be in the form of a mechanical universal joint, this being the exemplary joint used in describing the devices in this disclosure. This joint must be capable of allowing the base elements to change mutual orientation, but must prevent them from mutually turning and from moving apart from each other. The universal joint is surrounded by a pair of cut-down cylinders having an oblique truncated cylindrical form, which is defined as meaning that the end faces of each cylinder are non-parallel. One end of each cylinder is in sliding contact with one of the end elements of the link mechanism and the other ends of the cylinders are in sliding contact facing each other along an inclined plane generated because of the non-parallel nature of the ends of the cylinders. The inclined plane is so called because it is inclined relative to the planes perpendicular to the cylinder axes. The cylinders are most conveniently constructed having one end perpendicular to the cylindrical axis, that end being in contact with the base element, and the other end oriented at an angle different from the plane perpendicular to the cylindrical axis. It is to be understood, however, that this arrangement may generally be used only because it is a simpler configuration, and is not intended to exclude other implementations, in which, for instance, both ends of one or both the truncated cylinders are obliquely formed.

The two cylinders can be rotated relative to the base elements of the link mechanism using motors driven directly onto the cylinders, or through an external gear. Relative rotation between the two cylinders results in a change of the inclination angle between the axial centerlines of the upper and lower cylinders as they rotate. On the other hand, simultaneous synchronized rotation of both cylinders in the same direction and at the same speed, causes them to act as a single solid unit, such that the inclined link mechanism rotates around the axis through one of the cylinders, with the other axis inclined at the angle at which the output platform is oriented relative to the base. Consequently, the azimuthal orientation of the inclination of the link mechanism can be rotated 0-360° in space. A combination of both of these rotation modes provides the ability to amend the pose of the robotic link mechanism within the envelope made available by the angle of inclination of the two cylinders. Thus, the inclination angle of the link mechanism is achieved by rotating one the cylinder with respect to the other while the orientation of the inclined cylinder is achieved by a synchronized rotation of both cylinders.

Although a mechanical universal joint is the exemplary passive joint used in the devices described in this disclosure, it is to be understood that the invention is not intended to be confined to the use of such a mechanical universal joint, but that any other flexible shaft, such as a spiral spring element, or a pair of half-shafts connected by a flexible polymer central section, could equally well be used, on condition that the joint can withstand the tensional and compressional forces applied thereto. Whatever flexible element is used, it should fulfil the requirements that it be capable of allowing the base elements to change mutual orientation, but must prevent them from mutually turning and from moving apart from each other.

The function of the flexible passive joint between the base elements is to hold the base elements together and prevent mutual rotation of the base elements, while allowing the cylinders captured between them to change their mutual orientations. Further implementations of the robotic link mechanism of the present disclosure can achieve this aim by externally clamping the cylinders rotatably to the base elements and the cylinders to each other. This can be achieved by the use of clamping rings mounted on lip-like flanges formed at the ends of the cylinders and on the base elements, such that they clamp adjacent lips together, preventing their separation, but allowing them to mutually rotate. Thus, the cylinders can be attached to their base elements and the cylinders to each other, without impeding their relative rotation. An additional element must be provided to prevent the base elements from rotating relative to each other. These embodiments have the advantage of leaving a large clear passageway along the axis of the device, such as could be useful for many industrial and medical applications.

The only rotating parts of the link mechanism are the inclined cylinders, while the base elements of the device are fixed, and act as supports for the rotation motors and associated gears. This kinematic arrangement results in a backbone composed of a passive universal joint, (at least for those implementations that incorporating the centrally located universal joint) which is supported and actuated by the cylindrical structure that serves as an active exoskeleton. Consequently, this mechanical design can withstand high bending and twisting torques because bending torques resulting from self-weight and external loads are handled by the exoskeleton structure, at the inclined plane connecting the two cylinders and at the contact planes of the cylinders with the mechanism base elements. These cylindrical elements have substantial stiffness against bending or distortion.

Furthermore, when the inclination or orientation of the device is changed, the motor torque needs to be sufficient only to overcome the frictional forces along the sliding surfaces, namely the inclined plane sliding surface and the base plane sliding surface. Relative to the mechanism's self-weight, these torques can be made very low, because of the low friction coefficient achievable between the rotating surfaces. Specific constructions and resulting values of friction coefficient achievable are given in the Detailed Description section hereinbelow.

According to further implementations of the robotic link mechanisms described in this disclosure, it is possible to serially connect a number of such mechanisms end to end, and thereby to construct a hyper-redundant robotic arm, having many degrees of freedom, which is highly rigid, accurate, and can lift heavy payloads. These unique properties arise from two characteristics of the presently described robotic link mechanisms:

(i) the rotation of the cylinders using the motors needs only to overcome the sliding frictional forces, which are lower by approximately one order of magnitude (the coefficient of friction) than the gravitational forces resulting from the weight of a sturdy long arm and its payload, which are handled in this device by the exoskeleton structure, and (ii) the exoskeleton structure, which handles the self weight of the entire arm and payload, can have a much higher stiffness/weight ratio than a conventional articulated arm.

There is thus provided in accordance with an exemplary implementation of the devices described in this disclosure, a robotic mechanism comprising:

(i) a first and a second base element,
(ii) a passive flexible joint connecting the first and second base element, such that the joint flexes with change in the mutual orientation of the base elements,
(iii) first and second cylinders, each having an oblique truncated form, the cylinders being confined between the base elements such that an obliquely formed end surface of the first cylinder and an obliquely formed end surface of the second cylinder can mutually rotate in sliding association with each other, and
(iv) first and second driving motors attached to the first and second base elements, each driving motor being coupled to enable rotation relative to its base element of the cylinder adjacent to that base element, such that rotation of at least one of the cylinders causes the base elements to undergo change in their mutual orientation.

In such a mechanism, the passive flexible joint should be connected to the base elements such that it prevents the base elements from separating, thereby confining the first and second cylinders between the base elements. Additionally, the motors should be adapted to generate relative rotation between the two cylinders, such that the axes of the cylinders undergo mutual change in inclination as the cylinders rotate relative to each other. In such mechanisms, a combination of rotation modes of the cylinders thus enables adjustment of the pose of one of the base elements relative the other, within the envelope made available by the angles of inclination of the obliquely formed end surfaces of the two cylinders. Furthermore, rotation of one of the cylinders with respect to the other defines a combination of the inclination and the azimuthal orientation of one of the cylinder axes relative to the other.

Furthermore, in any of the above-described mechanisms, synchronized rotation of both the cylinders in the same direction and at the same speed should define the azimuthal orientation of one of the cylinders relative to the other, while keeping the inclination fixed.

Alternatively, synchronized rotation of both the cylinders in opposite directions and at the same speed defines the inclination angle of one of the cylinders relative to the other while keeping the azimuthal orientation fixed.

In any of the above described examples of robotic mechanisms, both of the end surfaces of at least one of the cylinders may be obliquely formed end surfaces, or that end surface of at least one of the cylinders, in sliding rotational contact with its associated base element, may be formed perpendicular to the axis of the at least one cylinder.

According to further exemplary implementations, the passive flexible joint connecting the first and second base elements may be any one of a mechanical universal joint, a flexible shaft, a spiral spring element, and a pair of half-shafts connected by a flexible polymer central section. Alternatively, it may be an inverted universal joint assembly external to the axis of the cylinders, such that the axis can be free of impediments.

Additionally, alternative implementations of the above-described robotic mechanisms may comprise:

(i) a first and a second base element,
(ii) first and second cylinders, each having an oblique truncated form, the cylinders being confined between the base elements such that an obliquely formed end surface of the first cylinder and an obliquely formed end surface of the second cylinder can mutually rotate in sliding association with each other,
(iii) clamping elements adapted to confine the cylinders between the base elements in rotary sliding association with each other and with their respective base elements, and
(iv) first and second driving motors attached to the first and second base elements, each driving motor being coupled to enable rotation relative to its base element of the cylinder adjacent to that base element, such that rotation of at least one of the cylinders causes the base elements to undergo change in their mutual orientation.

In such a mechanism, the motors are adapted to generate relative rotation between the two cylinders, such that the axes of the cylinders undergo mutual change in inclination as the cylinders rotate relative to each other. In such mechanisms, rotation of one of the cylinders with respect to the other should define a combination of the inclination and the azimuthal orientation of one of the cylinder axes relative to the other. Additionally, both of the end surfaces of at least one of the cylinders may be obliquely formed end surfaces, or that end surface of at least one of the cylinders, in sliding rotational contact with its associated base element, may be formed perpendicular to the axis of the at least one cylinder.

Still other example implementations involve a method of applying robotic motion between two base elements, comprising:

(i) providing a first and a second base element,
(ii) providing a passive flexible joint connecting the first and second base elements such that the joint flexes with change in the mutual orientation of the base elements,
(iii) providing first and second cylinders, each having an oblique truncated form, the cylinders being confined between the base elements such that an obliquely formed end surface of the first cylinder and an obliquely formed end surface of the second cylinder can mutually rotate in sliding association with each other, and
(iv) rotating at least one of the first and second cylinders relative to its associated base element, such that the base elements change their mutual orientation.

In such a method, the rotating may be achieved by means of a motor mounted on the base element associated with the cylinder which is to be rotated. According to this method, rotation of one of the cylinders with respect to the other may then define a combination of the inclination and the azimuthal orientation of one of the cylinder axes relative to the other. Furthermore, synchronized rotation of both the cylinders in the same direction and at the same speed will define the azimuthal orientation of one of the cylinders relative to the other, while keeping the inclination fixed, and synchronized rotation of both the cylinders in opposite directions and at the same speed will define the inclination angle of one of the cylinders relative to the other, while keeping the azimuthal orientation fixed.

A further exemplary method of applying robotic motion between two base elements comprises:

(i) providing a first and a second base element,
(ii) providing first and second cylinders, each having an oblique truncated form, the cylinders being confined between the base elements such that an obliquely formed end surface of the first cylinder and an obliquely formed end surface of the second cylinder can mutually rotate in sliding association with each other,
(iii) providing clamping elements adapted to confine the cylinders between the base elements in rotary sliding association with each other and with their respective base elements, and (iv) rotating at least one of the first and second cylinders relative to its associated base element, such that the base elements change their mutual orientation.

As in the previously described method, the rotating may be achieved by means of a motor mounted on the base element associated with the cylinder which is to be rotated. Rotation of one of the cylinders with respect to the other may then define a combination of the inclination and the azimuthal orientation of one of the cylinder axes relative to the other. Furthermore, synchronized rotation of both the cylinders in the same direction and at the same speed will define the azimuthal orientation of one of the cylinders relative to the other, while keeping the inclination fixed, and synchronized rotation of both the cylinders in opposite directions and at the same speed will define the inclination angle of one of the cylinders relative to the other, while keeping the azimuthal orientation fixed.

BRIEF DESCRIPTION OF THE DRAWINGS

The present invention will be understood and appreciated more fully from the following detailed description, taken in conjunction with the drawings in which.

DETAILED DESCRIPTION

Figure 1:
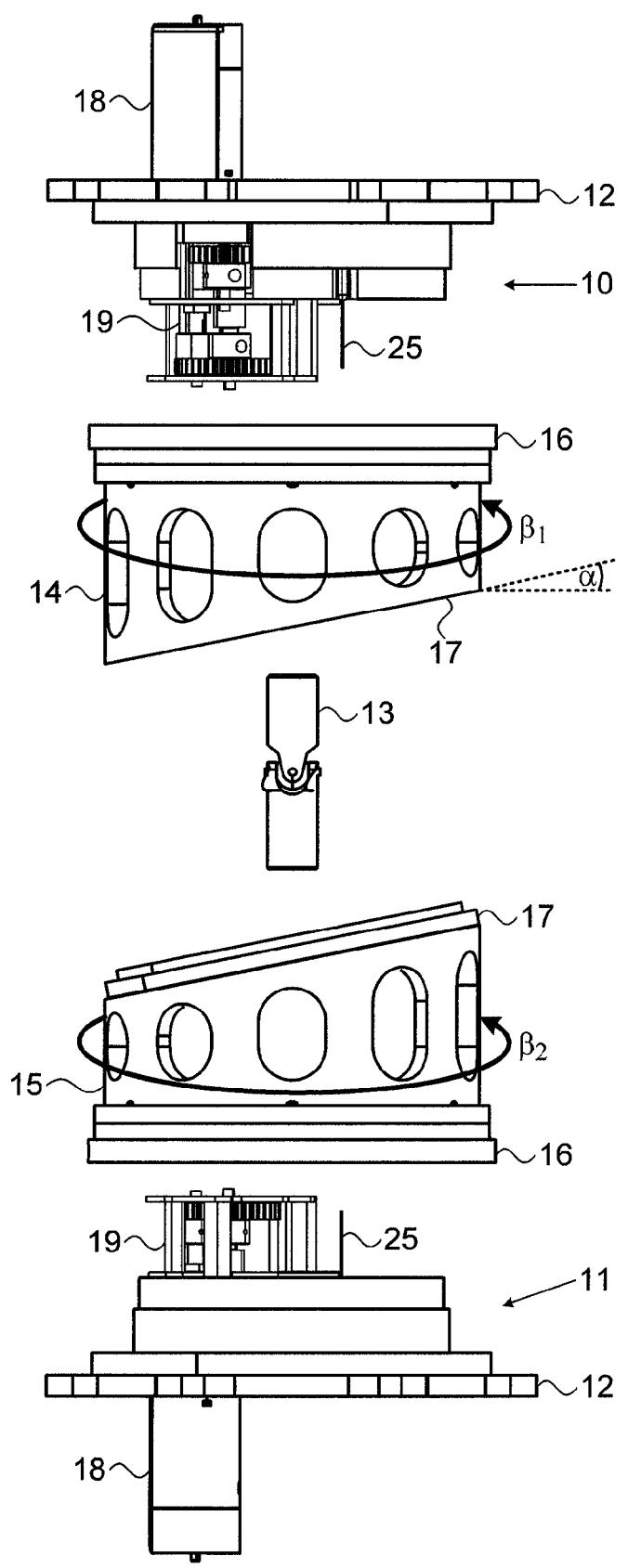
FIG. 1 shows an exploded view of an exemplary implementation of a robotic actuator device having a link mechanism of the type described in the present disclosure.

Reference is now made to FIG. 1 of which illustrates an exploded view of one exemplary implementation of a robotic actuator device having a link mechanism of the type described in the present disclosure. The device comprises a pair of base elements 10, 11, shown constructed on base flanges 12, the two base elements 10, 11, representing what is termed in common parlance as the static base and the actuated robotic platform of the robotic mechanism. Since the device is symmetric, the definition of which base element is the "static" base and which is the actuated output platform is nominal, since either end can be considered to be able to fulfill either function, depending on the specific use to which the robotic link is put. The base elements are connected together by a flexible joint 13 shown in FIG. 1 as a mechanical universal joint providing two degrees of freedom, though it could be any other form of flexible shaft. The universal joint is connected rigidly at its ends to the base elements such that the device remains firmly assembled. As such, it is only subjected to the tensional/compressive forces and torsional torques arising from the need to hold the two base elements 10, 11 together during application of payload forces to the robotic link mechanism. This universal joint is responsible for the kinematics of the device, and is never twisted around its axis but only bends, enabling the two base elements to change their relative orientation, as required for changing the robotic pose.

The universal joint is surrounded by a pair of oblique truncated cylinders 14, 15, held in contact between the two base elements 10, 11 by the universal joint connected to the two base elements. Each of these oblique truncated cylinders has one end formed as an obliquely oriented end surface 17, and the opposite end surface 16 formed perpendicular to the cylinder axis, and called hereinafter the "straight" end in contrast to the oblique end. The angle of the oblique end surfaces 17 of the cylinders is shown in FIG. 1 as having a value α, and in its simplest implementation, both the oblique truncated cylinders have the same angle α. The oblique truncated cylinders have their oblique end surfaces 17 in sliding rotary contact with each other, and the straight surfaces 16 in sliding rotary contact with the base elements 10, 11. The cylinders 14, 15, can be rotated, shown as $\beta_1$ and $\beta_2$ for the two cylinders, by means of a gear mechanism 19 driven by motors 18, which are preferably small DC motors with positional encoders or stepping motors. The gear mechanism 19 may, conveniently transfer its drive to the cylinders by means of an internal gear wheel in the straight end of the cylinders.

The torque required of the drive motors 18 is dependent on the friction coefficient between the rotating cylinders themselves and between the rotating cylinders and the base elements. Low friction can be obtained by use of PTFE journal bearings against the metallic bases and cylinders, which may be constructed of aluminium alloy for strength and lightness. The friction coefficient of PTFE and aluminium is of the order of 0.15, such that comparatively small motors can be used to provide the rotations required. In the device shown in FIG. 1, PTFE rings are used on all of the rotary sliding surfaces, both between the two rotating oblique surfaces 17, and between the straight surfaces 16 and the base elements. These PTFE rings also bear the compression, radial and shear stresses generated. The friction coefficient can be reduced even further by use of thrust bearings instead of sliding surfaces, or by using low friction coatings on the aluminium which enables the friction coefficient to be reduced to as low as 0.02. In this respect, it is important to emphasize this advantage of the present devices, from the point of view of the size of the motors required, over prior art devices. In the presently described link mechanism, the tension in the mechanism is carried totally by the universal joint, while compression is carried mostly by the exoskeleton structure, and partly by the universal joint. Torsional torques are handled totally by the universal joint when the robotic device or arm is straight, and partly by the exoskeleton when the arm is bent, while bending moments are carried mostly by the exoskeleton and are partly translated to tensional forces in the universal joint. The important feature is that unlike prior art robotic arms, where the motors drive the joints directly, in the present devices, all the forces, including those carried by the universal joint, are not carried directly by the motors. The forces that are carried by the exoskeleton structure are multiplied by the friction coefficient before becoming present at the motors, so that only a fraction of their magnitude is carried by the motors. This feature enables the use of substantially smaller motors than are used in prior art robotic actuators and arms of the same capacity.

Figure 2:
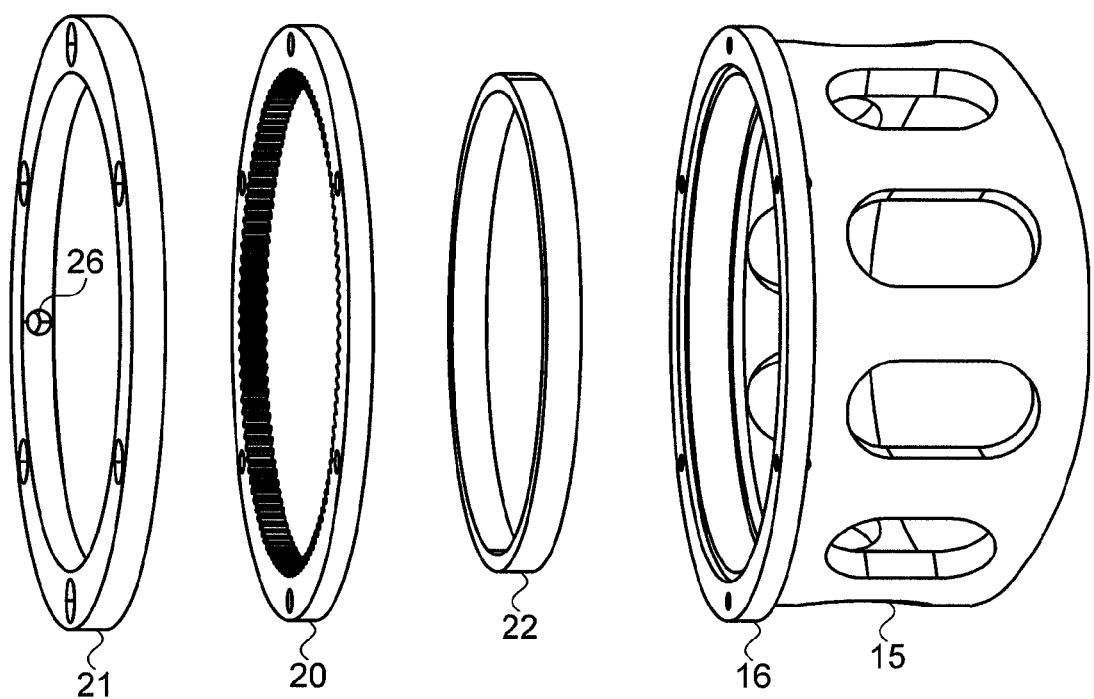
FIG. 2 shows schematically one method of transferring the drive from the base gear mechanism of the actuator to the rotating cylinder in contact with that base element.

Reference is now made to FIG. 2, which shows schematically one method of transferring the drive from the base gear mechanism 19 to the cylinder 15. A ring gear 20, having internal teeth, is attached to the straight surface flange 16 of the cylinder 15 by means of a clamping ring 21. The internal teeth of the ring gear mesh with the final drive of the gear mechanism 19 in the base element, thus rotating the cylinder. A radial stress bearing 22 may be used in order to center the cylinder rotational motion and to provide reaction to the radial stresses exerted on the rotational sliding joint by the payload on the robotic output arm. In addition, a PTFE ring is incorporated to separate the sliding surfaces and to bear the shear stresses.

Since the shape of the truncating surface of an oblique truncated cylinder is not a circle, but an ellipse, it is necessary to provide a matching interface to enable the two elliptic surfaces of the oblique ends of the cylinders, to rotate accurately and smoothly relative to each other. Although the departure from circular shape is small for a small oblique angle of the truncated cylinder, it is important to ensure accurate defined lateral position to ensure accuracy of pose control. One method may be to machine a circular recess into the inside wall of the elliptical oblique end surface of the cylinder, the internal diameter of the recess being matched to the external diameter of the shear stress bearing between the oblique surfaces. Alternatively, an outer circular surface can be machined on the elliptical cylinder end wall, and a circular adapter ring fitted onto this outer circular profile. Any other suitable interface may equally well be used. It is to be understood, and is also thuswise understood to be claimed, that when mention is made in this disclosure of the rotational sliding contact between obliquely formed end surfaces of the cylinders, the intention should be, where necessary, to corrected circular sliding surfaces, such as those described in this paragraph.

Figure 3:
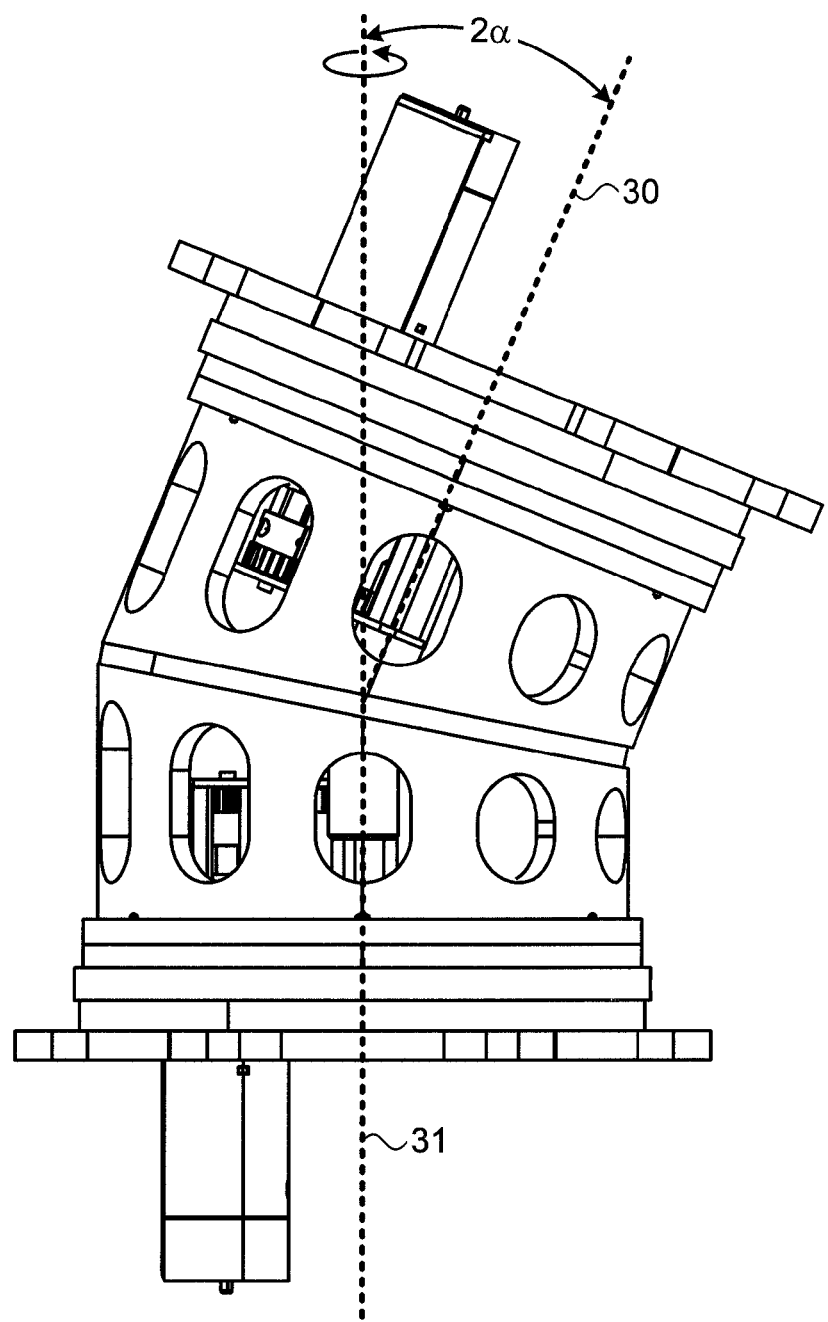
FIG. 3 shows schematically how the component parts of the device shown in FIG. 1 are connected to produce a completed robotic link mechanism.

Reference is now made to FIG. 3, which shows schematically how the component parts of the device as shown in FIG. 1 are connected to produce a completed robotic link mechanism. The cylinders are shown aligned in a mutual orientation such that the mechanism is bent at its maximum angle, with the angle between the input and output base elements being $2\alpha$, twice the angle of inclination of the oblique end surfaces, $\alpha$. In such a situation, rotation of both of the cylinders in the same direction and at the same speed will effectively "lock" the two cylinders into one virtual unit, resulting in the output shaft direction 30 performing a 360° rotation around the input shaft direction 31, with the inclination remaining constant at $2\alpha$.

On the other hand, relative rotation between the two cylinders results in a change of the inclination angle between the centerlines of the upper and lower cylinders as they rotate. In order to determine the relationships between the output platform inclination and the cylinder rotations, the kinematics of the link mechanism have to be solved.

The forward kinematics of the mechanism are not straightforward, in that the inclination angles of the arm are not directly or simply related to the rotation angle of the cylinders. The inverse kinematics transformation for a link is thus obtained by deriving the kinematic linkage between the arm inclination angles and cylinder rotation and hence the drive motor angles. Performance of this procedure provides the following results.

If $\theta_1$ and $\theta_2$ are the bending angles of the universal joint from their straight configuration, both of these angles are a function of the rotation angles $\beta_1$ and $\beta_2$ of the first and second truncated cylinders. Simple geometrical considerations show that $\theta_1$ and $\theta_2$ are given by:

$$\theta_1 = \alpha[(\cos \beta_1) - (\cos \beta_2)] \tag{1}$$

$$\theta_2 = \alpha[(\sin \beta_1) - (\sin \beta_2)] \tag{2}$$

where:
$\alpha$ is the angle of the oblique truncated cylinders,
$\beta_1$—Rotation angle of one of the truncated cylinders, and
$\beta_2$—Rotation angle of the other truncated cylinder.

In order to simplify the formalism, $\alpha$ is assumed to be the same for both of the cylinders. The bending angles $\theta_1$ and $\theta_2$ of the universal joint, for both of its perpendicular revolute joints, can be extracted from equations 1 and 2. When an isotropic flexible joint other than a universal mechanical joint is used, the values of $\theta_1$ and $\theta_2$ should be a pair of orthogonally oriented bending angles. From these bending angles, the inclination of the robotic actuator output and the azimuthal orientation can thus be readily determined.

Figure 4:
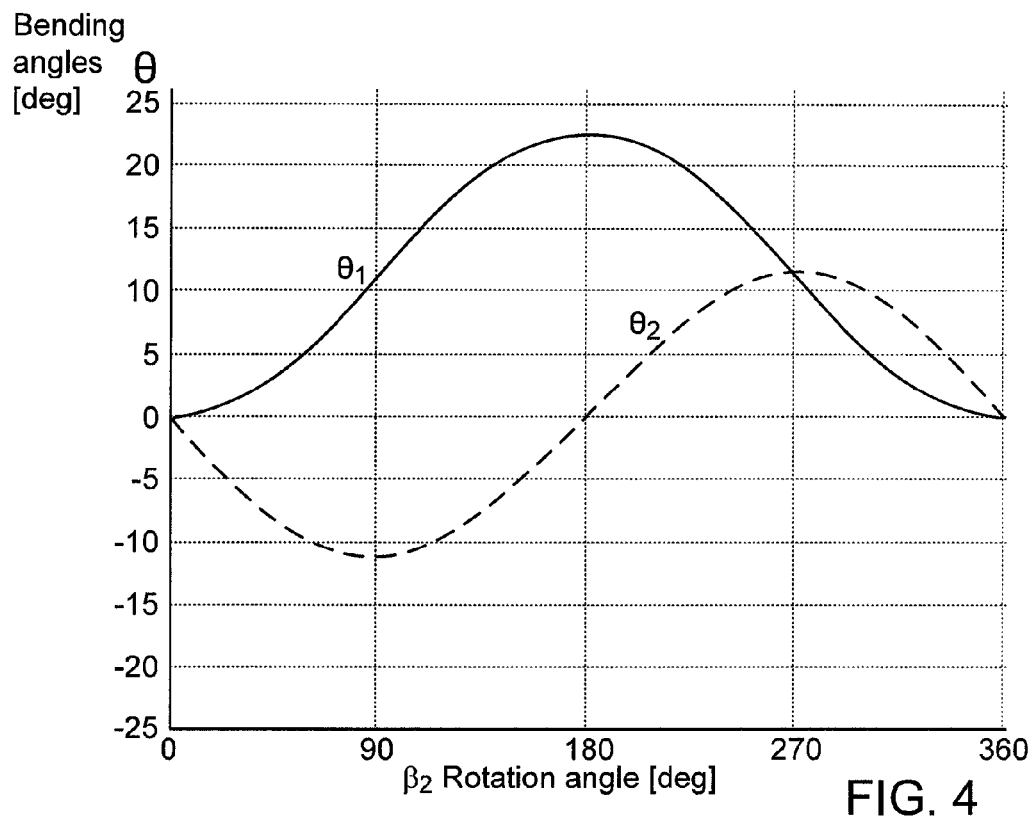
FIG. 4 is a graph showing the dependence of the bending angles of the universal joint as a function of the rotation angle of one of the obliquely truncated cylinders while the other is kept static.

Reference is now made to FIG. 4, which is a graph showing the dependence of the bending angles $\theta_1$ and $\theta_2$ of the universal joint as a function of the rotation angles $\beta_1$ and $\beta_2$ of the two obliquely truncated cylinders. In this graph, the bending angles are plotted for convenience for a fixed lower cylinder angle i.e. $\beta_1 = 0$, while the upper cylinder angle, i.e. $\beta_2$, goes through a full rotation. In FIG. 4, an angle $\alpha$ of 11.25° has been used.

As can be observed, in this case, the upper cylinder bends to a full inclination of $\theta_1 = 22.5°$ at $(\beta_2 - \beta_1) = 180°$, as is illustrated in the case of maximum inclination shown in FIG. 3. The upper cylinder bends to half of the maximum inclination, with both $\theta_1$ and $\theta_2 = \pm 11.25°$ at $(\beta_2 - \beta_1) = 90°$ and 270°. This figure represents the coupling between inclination and azimuthal orientation as a function of a single motor or cylinder rotation.

The obliquely truncated cylinder design and the manner in which the cylinders are actuated define a kinematic dependency between the azimuthal orientation of the plane in which the inclination is taking place, and the magnitude of inclination (angle) of the upper cylinder relative to the lower one.

Figure 5:
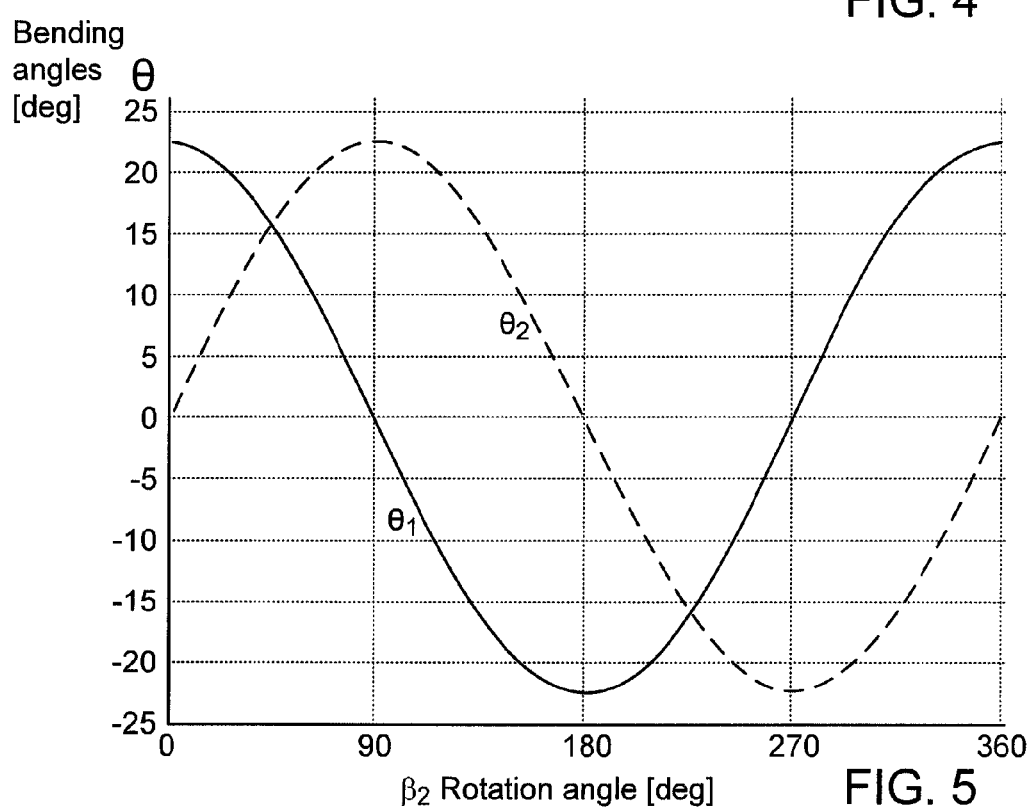
FIG. 5 is a graph showing the bending angles of the universal joint as a function of relative cylinder rotation for the case where both cylinders rotate in unison but with their oblique surfaces 180° out of phase giving constant maximum inclination and changing azimuth orientation 0-360°.

In order to choose the azimuthal orientation of the inclination plane, both truncated cylinders must be rotated at the same speed, meaning that $(\beta_2 - \beta_1)$ must be kept constant, where the constant is a measure of the magnitude of the inclination. This situation is shown in FIG. 5, which shows the bending angles as a function of cylinder rotation. For this case, both cylinders are rotated at the same speed and in the same direction, and the cylinders are aligned such that $\beta_2 = \beta_1 + 180°$, which, as shown pictorially in FIG. 3, results in an initial full inclination of 22.5° and rotation of both cylinders in the same direction through 360°. As is seen from the plot of FIG. 5, $\theta_1$ and $\theta_2$ are separated in phase by 90°, and reach the same amplitude, meaning a constant inclination of 22.5° while azimuthal orientation varies through a range of 0-360°.

Figure 6:
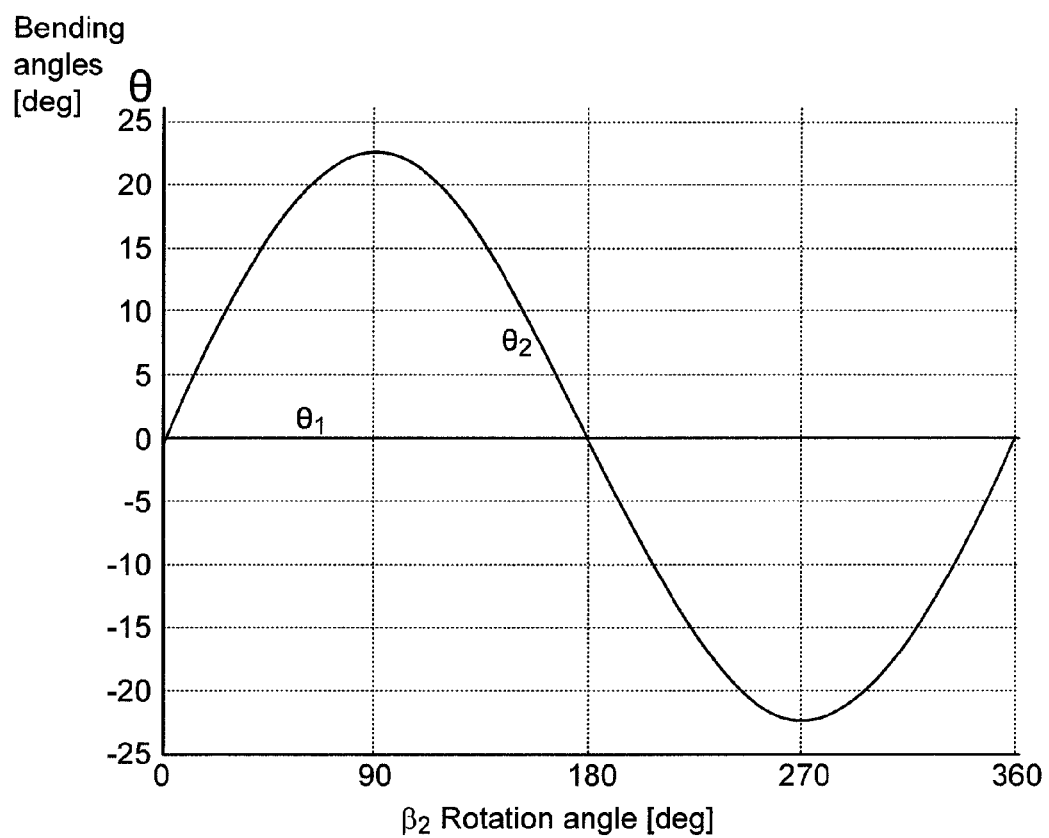
FIG. 6 is a graph showing the bending angles of the universal joint as a function of relative cylinder rotation for the case when both cylinders are rotated at the same speed but in opposite directions giving a constant azimuth orientation while changing the inclination angle.

In order to keep the azimuthal orientation of the inclination plane constant while changing the magnitude of inclination, both $\beta_1$ and $\beta_2$ must be rotated at the same speed but in opposite directions, having the algebraic meaning that $\beta_1+\beta_2$=constant, where this constant now determines the direction of inclination. Reference is now made to FIG. 6, where this situation is graphically illustrated by means of a graph showing the bending angles of the universal joint as a function of relative cylinder rotation for the case when both cylinders are rotated at the same speed but in opposite directions giving a constant azimuth orientation while changing the inclination angle. In FIG. 6, $\beta_2$ is kept equal to $-\beta_1$ during rotation, and as can be seen, $\theta_1$=0 while $\theta_2$, which in this case equals the angular magnitude of inclination, changes with rotation, reaching an amplitude of 22.5° in both opposite directions in the plane of azimuthal inclination.

Figure 7C:
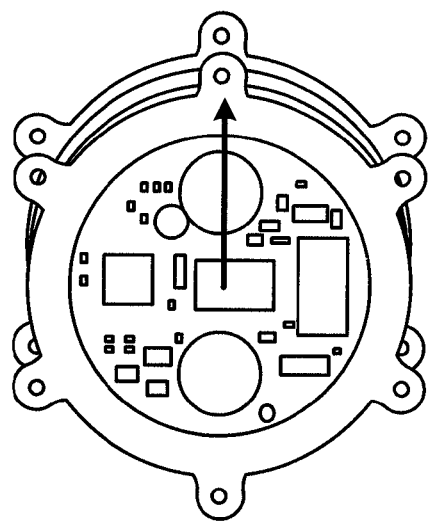
FIGS. 7A to 7C are schematic pictorial illustrations of three different poses of the robotic link mechanism described in the previous figures.
Figure 7B:
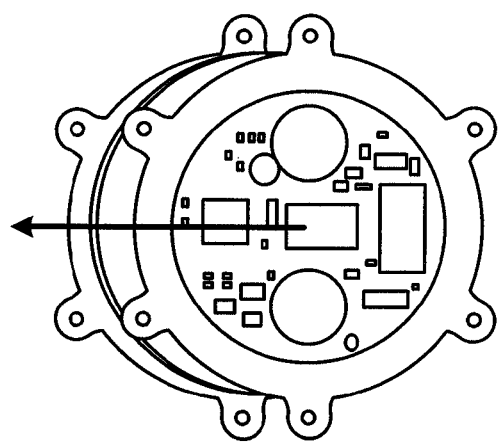
Figure 7A:
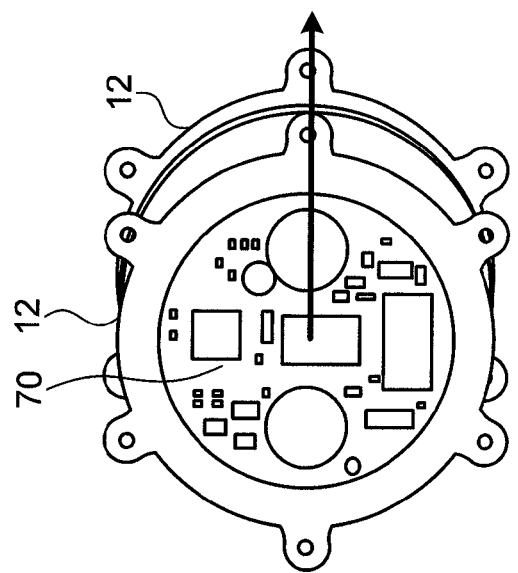

Reference is now made to FIGS. 7A to 7C, which are schematic pictorial illustrations of three different poses of the robotic link mechanism described in the previous drawings. FIGS. 7A to 7C show a plan view of the device, showing the opposite ended base flanges 12 of the device, so that the relative inclination of the device can be gauged in the drawings. The electronic control circuitry 70, used for converting the robot input commands into control signals for the motors, is shown installed in the end of the base unit. The device pose is designated by a polar arrow, where the orientation of the arrow represents the azimuthal orientation of the inclination plane of the mechanism, which can rotate 0 to 360°, while the length of the arrow represents the magnitude of the inclination angle, which can change from zero to 22.5°. In FIG. 7A, there is shown the link mechanism with maximum inclination, directed to the right of the drawing, representing an azimuthal orientation of 0°. In FIG. 7B, there is shown the link mechanism with maximum inclination directed to the top of the drawing, representing an azimuthal orientation of 90°. In FIG. 7C, there is shown the link mechanism with an inclination of smaller magnitude, directed to the right of the drawing, representing an azimuthal orientation of 0°. As is observed, the relative position and orientation of the flanges 12 in these figures reflect the pose of the link mechanism as represented by the arrows.

Although the various examples described hereinabove have used an oblique inclination angle of 11.25° for the truncated cylinders, it is possible to use larger angles to generate a larger robotic envelope for the resulting device. Using an inclination angle of 45° for each cylinder would result in a maximum inclination angle of 90° between the axes of both cylinders, and coverage of half of a sphere by the actuated robotic output. Larger coverage areas can also be achieved by using inclination angles larger than 45°. Furthermore, although the various examples described hereinabove have used identical oblique inclination angles for the two cylinders of the link mechanism, it is possible to use non identical inclination angles for the cylinders. Such a configuration will result in coverage of only part of the potential overall envelope, with a missing coverage area in the orientational center of the envelope, in the direction of the axis of the robotic base (input) cylinder. This is caused because the cylinders cannot reach an orientation with their axes collinear.

Figure 8:
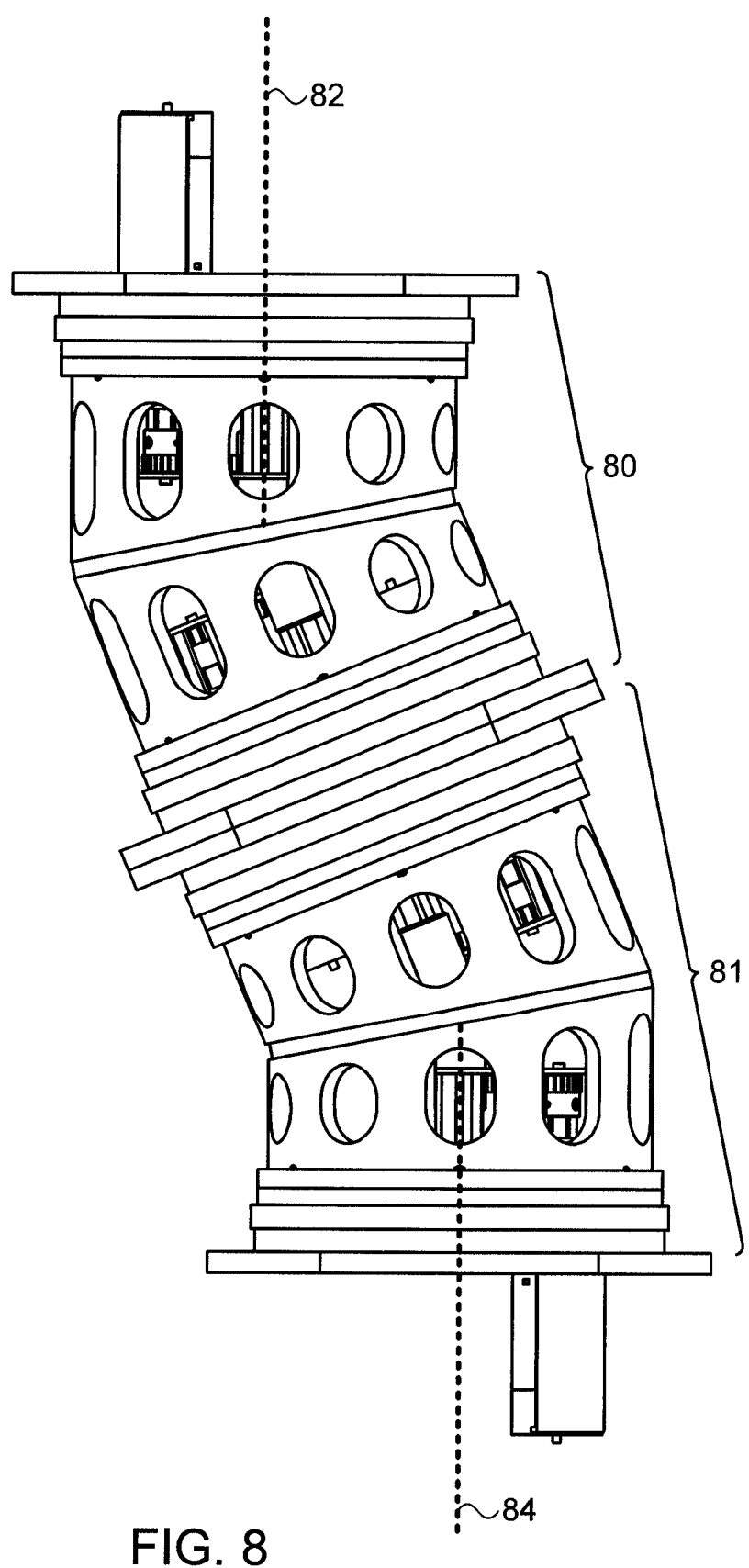
FIG. 8 illustrates schematically a pair of robotic link mechanisms of the type shown in FIGS. 1 and 3, joined serially, providing redundant robotic control between the input and output axes.

Reference is now made to FIG. 8, which illustrates schematically a pair of robotic link mechanisms 80, 81 of the type described hereinabove, joined serially, providing robotic control between the input and output axes 82, 84. Because each single link mechanism provides just the number of degrees of freedom necessary in order to direct the robotic end actuator in the direction desired, the use of a pair of such robotic link mechanisms provides motion redundancy. Although the example shown in FIG. 8 shows only two link mechanisms connected, it is feasible to connect several robotic link mechanisms serially, thus enabling a hyper-redundant robot (HRR) having long robotic arm to be constructed, having high flexibility properties. Such a robotic arm having low friction in the joints enabling small drive motors to be used, should thus have substantially improved characteristics compared to many of the types described in the background section, because of its light weight and its high stiffness/weight ratio. Since the forces applied to the various segments of such a long robotic arm decrease towards the actuating end of the arm, an efficient method of constructing such an arm is by making successive link mechanisms of smaller physical dimensions while proceeding towards the actuating end of the arm, analogously to an elephant's trunk. In particular, the drive motors can be made smaller towards the end of the arm, since the moment required to overcome the frictional forces of the rotational cylinder joints become smaller towards the end of the arm with the reduced self weight and payload moment. An HRR composed of eight robotic link mechanisms of the type described in this disclosure has been constructed, providing sixteen DOFs. Each of the 8 link mechanisms had the relatively low weight of 480 gm, and the complete HRR was 800 mm long and 77 mm. in diameter, and achieved high rigidity and accuracy. Even though the obliquely truncated cylinders used only an 11.25° incline, this 8-element arm was capable of 180° bending, thus demonstrating the versatility of the robotic link mechanisms of the present disclosure.

There are several applications where such an HRR arm may be useful given its high precision and strength. For example, this type of arm can be very useful for search and rescue applications, with the arm mounted on a mobile platform with a camera on its end-effector, to be used to look for survivors trapped inside collapsed rubble. This use lowers the risk to rescue workers of being trapped due to secondary collapse of structures. Another application for such an arm is remote bomb disposal. The arm allows for a large workspace combined with delicate and stable maneuvers via its gripper, unlike some currently used robots with their arms moving anthropomorphically, or in a limited vertical plane. Currently, with such platforms, the operator is obliged to manipulate the mobile platform in order to reach out of plane. The HRR arm of the present disclosure may be able to better perform this task than prior art HRR designs, due to its relative lightweight, long reach and high number of DOE, which, while providing the flexibility, does not prevent it from lifting as large payloads as current arms can. Another application for such an HRR arm is as a medical endoscopic device for diagnostics or performing operations inside large cavities such as the stomach. The arm design can create a chosen configuration in free space without the need to be supported and guided by the path of a given lumen, such as an artery or a gastric tract lumens. Instead the operator can insert the arm inside a human cavity, form a desired configuration in free space, bypassing obstacles and performing operations obstructed from the operator line of sight.

Figure 9A:
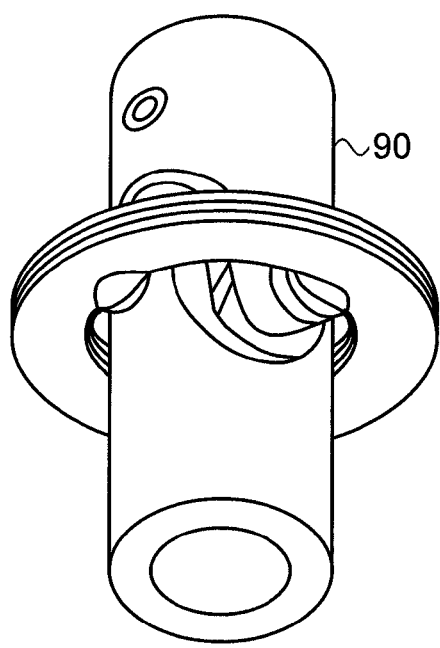
FIGS. 9A and 9B. illustrate schematically examples of inverted universal joints which can be used in a further implementation of a robotic link mechanisms enabling the provision of a clear passageway down the center of the device.
Figure 9B:
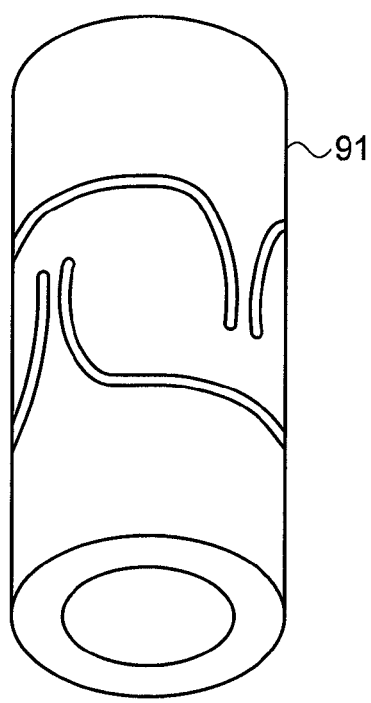

According to a further implementation of the robotic link mechanisms of the type described in this disclosure, the provision of a clear passageway down the center of the device enables its use in a number of applications where such a clear central opening is used. Since the devices shown in the previous figures of this disclosure are constructed with conventional universal joints disposed in the central region of the end base elements and the circumferential cylinders, such a clear central passageway was not implementable. A clear central passageway can be obtained if the flexible joint is implemented as an inverted universal joint that holds the base elements without obstructing the central axial region thereof. An example of a conventional inverted universal joint 90 is shown in FIG. 9A, whilst FIG. 9B shows a novel hollow axis flexible joint 91, as described in the article entitled "A new Isotropic and Decoupled 6-DoF Parallel Manipulator, by G. Legnani et al, to be published in Mechanism and Machine Theory, Vol. 58, pp. 64-81, December 2012. The control motors must then also be installed in a position where they do not obstruct the desired hollow central passage of the device, as is the case in the illustrated devices of this disclosure, and the controller circuit boards 70 and base flanges should also have a central clearance. The simplicity of the construction of the joint shown in FIG. 9B may make it more suitable for use in this link mechanism than that of FIG. 9A, since the lack of mechanical bearings enables its to be constructed in a larger size, providing a larger clear central channel.

Figure 10:
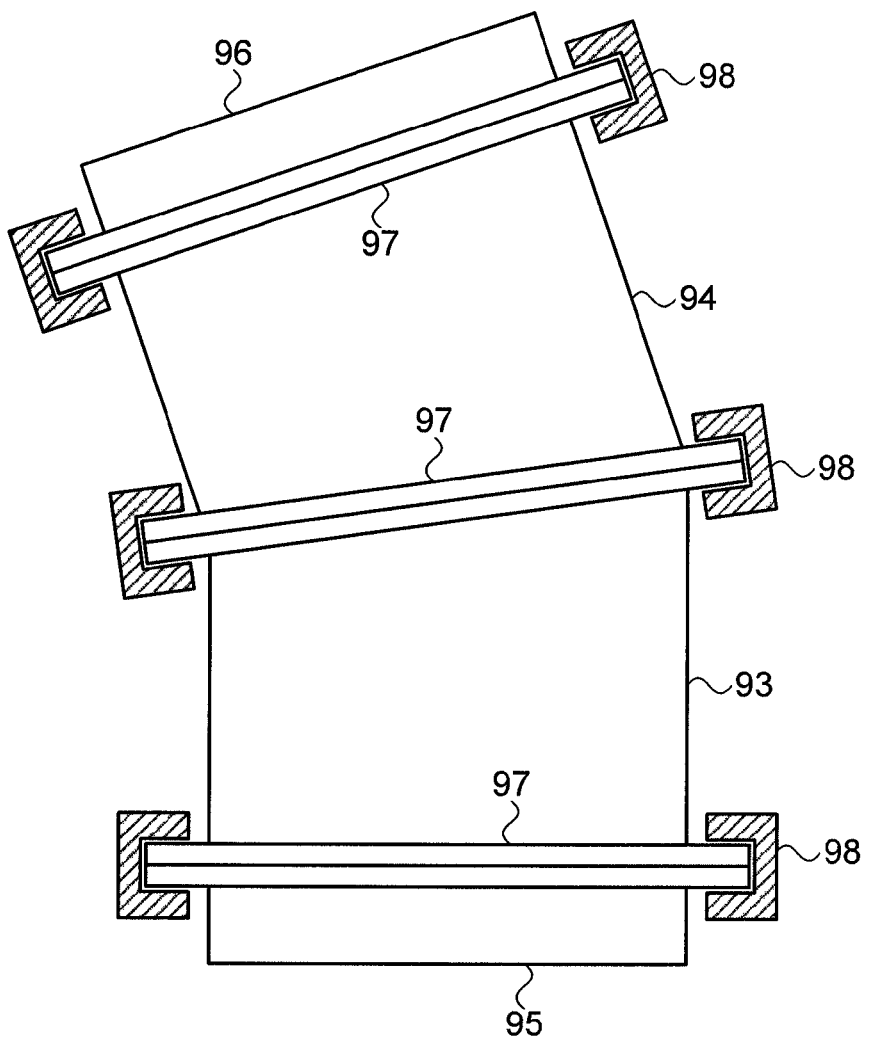
FIG. 10 illustrates schematically the use of ring clamps to attach the cylinders to each other and the cylinders to the base elements.

Reference is now made to FIG. 10, which illustrates schematically an additional method by which the base elements are held in contact, while allowing the cylinders captured between them to change their mutual orientations, and providing a large clear channel down the center of the mechanism. In the implementation of FIG. 10, the oblique truncated cylinders 93, 94 have lip flanges 97 around their ends, providing a clamping surface onto which circular clamping structures, such as the C-profile rings 98 shown, can be fitted. This structure enables the cylinders to mutually rotate, yet without becoming separated from each other. The clamping rings 98 should be tightly enough fitted such that undue longitudinal motion of the cylinders is prevented, thus maintaining the accuracy of the robotic link mechanism, but not so tight as to impede the mutual rotation of the cylinders. A similar structure is used to enable the cylinders to be rotatably clamped to the end base elements 95, 96. In order to prevent mutual rotation of the base units, some form of clamping mechanism must be used, such as hinged telescopic rods connecting the two base elements at different circumferential points, suitably arranged to allow the base units to tilt but not to rotate. Separation is prevented by the ring clamps. The base elements should incorporate the driving motors for turning the cylinders, and these motors should be offset from the central region to leave that central channel clear of obstruction. Either bearings, or intermediate rings of a low friction material such as PTFE, or coatings of such low friction materials can be used to reduce the frictional forces present during rotation. Because of the elliptic shape of the end of the oblique truncated cylinder, it is necessary for the lip flange to provide conversion from the elliptic shape to a circular outer rim. The rings can be assembled over the double lip flanges 97 by any of the known conventional methods, such as by assembling the lip flanges to the base or cylinders after the clamping rings 98 have been inserted in them, or by constructing the clamping rings of two halves, which are assembled with the lip flanges in place, or by similar methods.

Such robotic link mechanisms having a clear central passage can be highly advantageous for applications such as pan tilt camera, with the camera centered inside the mechanism, or in beam steering of optic fibers, where the optic fiber is centered inside the mechanism. Additionally, endoscopic applications, whether diagnostic or therapeutic, mandate a clear central aperture. An HRR robotic arm as described in FIG. 8 using flexible joints with a clear central passageway, or a ring clamping method, would be suitable for such applications.

In addition, as mentioned previously, an important mechanical feature of the link mechanism of the present disclosure is that the bases of the link are fixed and do not rotate. This feature is important in that it prevents twisting of electrical control and power wires, and of any optic fibers or working tools for endoscopic applications running along the length of the robotic arm, hence simplifying construction by not limiting the rotation of any or all of the links.

With regard to the control system for actuating the electric motors, position control feedback of each rotating cylinder may be achieved using the DC motor encoders, with an additional position dependent sensor as the index for each full rotation of each rotating cylinder to enable homing. Such a sensing element is shown in FIG. 1 as a magnetic reed switch 25. The reed switch 25 is shown located inside a through hole in the base which does not rotate, while a small magnet 26, may be located inside the rotating cylinder connected to the outer gear, as shown, for instance in the flange 21 of FIG. 2. Distributed control architecture for the robotic motion control may be implemented by means of a local control board disposed in the back of the base of each link, as shown in FIGS. 7A to 7C. A communication central data bus, such as RS485, connects all the local control boards to a single high-level controller where robotic motion planning and inverse kinematics are performed.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A robotic mechanism comprising:
   a first and a second base element;
   first and second cylinders, each having an oblique truncated form, said cylinders being confined between said base elements such that an obliquely formed end surface of said first cylinder and an obliquely formed end surface of said second cylinder can mutually rotate in sliding association with each other;
   first and second driving motors attached to said first and second base elements, each driving motor being coupled to enable rotation relative to its base element of the cylinder adjacent to that base element, such that rotation of at least one of said cylinders causes said base elements to undergo change in their mutual orientation; and
   a passive inverted universal joint connecting said first and second base element such that said base elements are prevented from separating, and connected external to the axes of said cylinders, such that said axes can be free of impediments.

2. A robotic mechanism according to claim 1, wherein said motors are adapted to generate relative rotation between said two cylinders, such that the axes of said cylinders undergo mutual change in inclination as said cylinders rotate relative to each other.

3. A robotic mechanism according to claim 1, wherein a combination of rotation modes of said cylinders enables adjustment of the pose of one of said base elements relative to the other, within the envelope made available by the angles of inclination of the obliquely formed end surfaces of said two cylinders.

4. A robotic mechanism according to claim 1, wherein rotation of one of said cylinders with respect to the other defines a combination of the inclination and the azimuthal orientation of one of said cylinder axes relative to the other.

5. A robotic mechanism according to claim 1, wherein synchronized rotation of both said cylinders in the same direction and at the same speed defines the azimuthal orientation of one of said cylinders relative to the other, while keeping the inclination fixed.

6. A robotic mechanism according to claim 1 wherein synchronized rotation of both said cylinders in opposite directions and at the same speed defines the inclination angle of one of said cylinders relative to the other while keeping the azimuthal orientation fixed.

7. A robotic mechanism according to claim 1, wherein both of said end surfaces of at least one of said cylinders are obliquely formed end surfaces.

8. A robotic mechanism according to claim 1, wherein that end surface of at least one of said cylinders, in sliding rotational contact with its associated base element, is formed perpendicular to the axis of said at least one cylinder.

9. A robotic mechanism comprising:
a first and a second base element;
first and second cylinders, each having an oblique truncated form, said cylinders being confined between said base elements such that an obliquely formed end surface of said first cylinder and an obliquely formed end surface of said second cylinder can mutually rotate in sliding association with each other;
first and second driving motors attached to said first and second base elements, each driving motor being coupled to enable rotation relative to its base element of the cylinder adjacent to that base element, such that rotation of at least one of said cylinders causes said base elements to undergo change in their mutual orientation;
clamping elements disposed external to said cylinders adapted to confine said cylinders between said base elements in rotary sliding association with each other and with their respective base elements; and
at least one attachment member connected between said base elements to prevent their mutual angular rotation.

10. A robotic mechanism according to claim 9, wherein said motors are adapted to generate relative rotation between said two cylinders, such that the axes of said cylinders undergo mutual change in inclination as said cylinders rotate relative to each other.

11. A robotic mechanism according to claim 9, wherein rotation of one of said cylinders with respect to the other defines a combination of the inclination and the azimuthal orientation of one of said cylinder axes relative to the other.

12. A robotic mechanism according to claim 9, wherein both of said end surfaces of at least one of said cylinders are obliquely formed end surfaces.

13. A robotic mechanism according to claim 9, wherein that end surface of at least one of said cylinders, in sliding rotational contact with its associated base element, is formed perpendicular to the axis of said at least one cylinder.

14. A robotic mechanism according to claim 1, wherein said passive inverted universal joint is any one of a flexible shaft, a spiral spring element, and a pair of half-shafts connected by a flexible polymer central section.

15. A robotic mechanism according to claim 9, wherein said clamping elements disposed external to said cylinders are C-profile segments fitted onto lip flanges formed on said end surfaces of adjacent pairs of said cylinders.

16. A robotic mechanism according to claim 9, wherein said at least one attachment member comprises hinged telescopic rods connecting said base elements at different circumferential points.

17. A robotic mechanism according to claim 9, wherein a combination of rotation modes of said cylinders enables adjustment of the pose of one of said base elements relative to the other, within the envelope made available by the angles of inclination of the obliquely formed end surfaces of said two cylinders.

18. A robotic mechanism according to claim 9, wherein synchronized rotation of both said cylinders in the same direction and at the same speed defines the azimuthal orientation of one of said cylinders relative to the other, while keeping the inclination fixed.

19. A robotic mechanism according to claim 9, wherein synchronized rotation of both said cylinders in opposite directions and at the same speed defines the inclination angle of one of said cylinders relative to the other while keeping the azimuthal orientation fixed.

* * * * *